United States Patent [19]

Witt et al.

[11] 3,828,827
[45] Aug. 13, 1974

[54] MANUFACTURE OF WOVEN WIRE TIRE CORD FABRIC

[75] Inventors: Jerry L. Witt, Winnsboro; Allen Layson, Columbia, both of S.C.

[73] Assignee: Uniroyal, Inc., New York, N.Y.

[22] Filed: July 31, 1972

[21] Appl. No.: 276,483

[52] U.S. Cl............... 139/99, 139/304, 139/425 R, 152/358
[51] Int. Cl...................... D03d 49/04, D03d 15/02
[58] Field of Search............ 139/97, 304, 307, 308, 139/35, 99, 104, 1 R, 425 R, 383 R, 426, 55; 152/357 W, 358, 359

[56] References Cited
UNITED STATES PATENTS

| | | | |
|---|---|---|---|
| 949,888 | 2/1910 | Evans................................. | 152/358 |
| 1,383,190 | 6/1921 | Demas.............................. | 152/358 X |
| 1,421,081 | 6/1922 | Hall.................................. | 139/99 X |
| 1,455,048 | 5/1923 | Hall et al.............................. | 139/99 |
| 1,457,892 | 6/1923 | Blackwelder....................... | 139/425 R |
| 1,560,700 | 11/1925 | Langer................................ | 152/358 |
| 2,257,646 | 9/1941 | Pierce................................ | 152/358 |
| 2,293,666 | 8/1942 | Santon.............................. | 139/307 |
| 3,087,699 | 4/1963 | Foster............................... | 139/425 R |
| 3,395,744 | 8/1968 | Wolf et al......................... | 152/358 |
| 3,525,367 | 8/1970 | Sprague........................... | 139/99 X |
| 3,534,782 | 10/1970 | Young............................... | 139/426 R |

FOREIGN PATENTS OR APPLICATIONS

| | | | |
|---|---|---|---|
| 46-12041 | 3/1971 | Japan.............................. | 139/426 R |
| 6,954 | 1910 | Great Britain.................. | 139/425 R |
| 373,902 | 4/1923 | Germany......................... | 139/425 R |

Primary Examiner—James Kee Chi
Attorney, Agent, or Firm—Norbert P. Holler, Esq.

[57] ABSTRACT

A novel method and apparatus for producing plain or leno woven wire tire cord fabric, in which fabric the metal wire cord warps are interwoven with relatively widely spaced continuous textile filament picks and which is characterized by high dimensional stability and maintenance of uniformity of cord distribution during take-up as well as during calendering and subsequent tire building operations, are disclosed. The fabric can be woven on a textile loom of generally conventional construction but provided with special auxiliary equipment designed to maintain a required tension control on the tire cords both when they enter the loom and when they leave the loom as components of the woven fabric. This abstract is not to be taken either as a complete exposition or as a limitation of the present invention, however, the full nature and extent of the invention being discernible only by reference to and from the entire disclosure.

11 Claims, 4 Drawing Figures

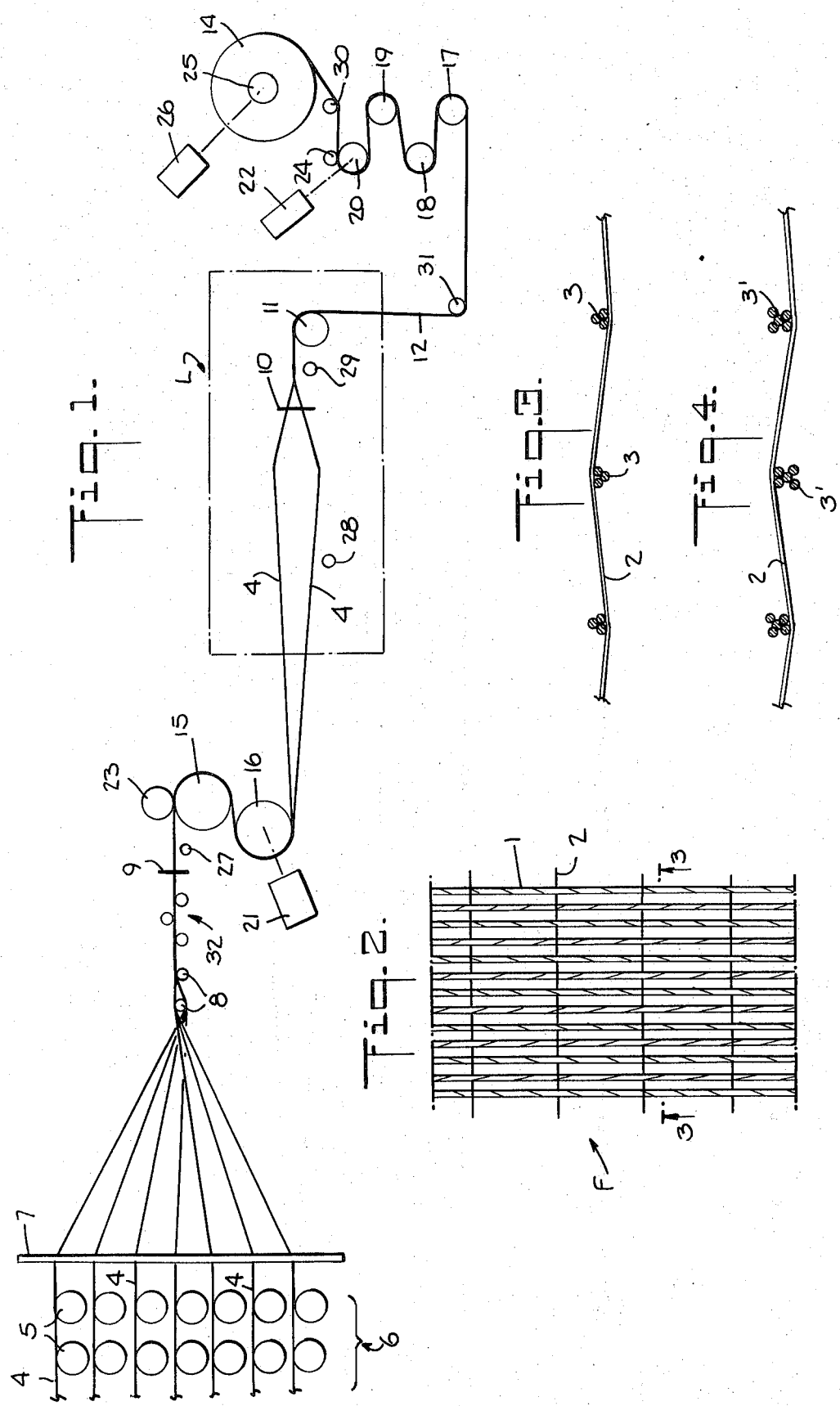

MANUFACTURE OF WOVEN WIRE TIRE CORD FABRIC

This invention relates to the art of manufacturing woven metal wire tire cord fabric.

It has heretofore been proposed to utilize rubberized plies of metal wire tire cords, generally made of brass-coated steel wire, in the manufacture of pneumatic tires, for example to constitute the belt plies of belted radial and bias ply tires. The best tire utilizing such metal cord ply material is produced when the cords are as much as possible parallel to each other. Conventional ply-forming practice in the industry has been to draw the requisite number of individual wire tire cords from respective spools on a creel, first through a suitable guide arrangement for shifting the wires into a parallel planar array of appropriate width and then directly through a calender in which the array of cords is coated with rubber to form the cohesive ply material. This "creel to calender" method of producing wire tire cord ply material has led to certain problems, however. Since the individual cords entering the calender are not tied to each other, it frequently happens that one or more cords will be laterally shifted out of the intended path thereof in passing through the calender, resulting in an uneven and non-uniform distribution of the cords across the width of the fabric ply. The strength of a tire, i.e., its resistance to penetration, where reinforced by such a ply thus may not adequately meet uniformity and safety requirements and standards. Yet another problem is that it is difficult in the "creel to calender" method to maintain the cords under constant and uniform tension.

Proposals have been made heretofore to assemble wire cords for use as tire reinforcements into the form of a woven fabric having the cords extending in the warp direction and interwoven with picks of either metal wire or non-metallic continuous filaments, for example monofilaments of synthetic fibers such as linear polyethylene, polypropylene, nylon, saran, and the like (see, for example, U.S. Pat. No. 3,087,699). Nevertheless, such woven wire fabrics did not gain any wide acceptance in the tire industry, presumably at least in part because, contrary to expectations, available weaving techniques and related processes did not yield fabrics having the requisite degree of stability during take-up and calendering and capable of making good tires.

It is the basic object of the present invention, therefore, to provide a novel method of and apparatus for making plain or leno woven wire tire cord fabric which avoids the disadvantages and drawbacks of such fabrics heretofore encountered and which leads to the production of satisfactory tires.

Generally speaking, the objectives of the present invention are attained by interweaving the metal wire tire cords with continuous filament picks, preferably of a synthetic textile fiber, in a conventional textile loom provided with special equipment to maintain a required tension control on the tire cords both on entering the loom and on leaving the loom. In the presently deemed best mode of the invention, a set of feed rolls around which the cords are adapted to pass is positioned in front of the loom as viewed in the direction of movement of the tire cords, the first of the feed rolls in the series being closely juxtaposed to a pressure roll weighted or otherwise biased thereagainst and defining in conjunction therewith a nip for passage of the tire cords therethrough. The feed rolls, which are provided with high friction surfaces to minimize slippage between the tire cords and the feed rolls, are geared to or otherwise synchronized with each other, the last of the feed rolls in the series being positively driven by a variable speed motor set for a speed correlated with the loom speed so as to ensure that the picks are properly spaced.

At the fabric let-off end of the loom, the take-up system includes axial support means for the core of a fabric take-up beam or roll, and a plurality of draw rolls positioned intermediate the fabric let-off end of the loom and the take-up roll, the last of the draw rolls in the series being closely juxtaposed to a pressure roll weighted or otherwise biased thereagainst and defining in conjunction therewith a nip for passage of the woven fabric therethrough. The draw rolls, which are also provided with high friction surfaces to minimize slippage between the tire cords and the draw rolls, are geared to or otherwise synchronized with each other, and respective suitably controlled variable torque motors are connected to the last of the draw rolls in the series and to the axial support for the take-up roll for positively driving each of the same.

It is found that plain or leno woven wire tire cord fabric produced in accordance with the present invention can be drawn from the roll and calendered without distortion or lateral displacement of the tire cords relative to one another, and that ply material so formed is conducive to the manufacture of high quality tires having uniform strength and dimensional characteristics.

The foregoing and other objects, characteristics and advantages of the present invention will be more clearly understood from the following detailed description thereof when read in conjunction with the accompanying drawing, in which:

FIG. 1 is a diagrammatic illustration of the process of, and the salient portions of the apparatus for, producing woven wire tire cord fabric in accordance with the present invention;

FIG. 2 is a fragmentary plan view of a woven wire tire cord fabric produced by the process and apparatus illustrated in FIG. 1;

FIG. 3 is a fragmentary, greatly enlarged sectional view taken along the line 3—3 in FIG. 2 and illustrates the fabric formed with warps of three-wire tire cords; and FIG. 4 is a fragmentary, greatly enlarged sectional view similar to FIG. 3 and illustrates the fabric formed with warps of five-wire tire cords.

Referring now to the drawing in greater detail, the present invention is directed to the production of a woven tire cord fabric F (FIG. 2) having warps 1 constituted by respective metal wire tire cords and interwoven with picks 2 constituted by respective continuous filament strands. The tire cords 1, which may be in the form of single wires, normally are in the form of plural-wire strands each consisting of several wires twisted together, for example, three-wire constructions such as are designated 3 in FIG. 3 or five-wire constructions such as are designated 3' in FIG. 4. Drawn or spun steel wires of appropriately small diameter, typically about 0.010 inch in diameter (although this dimension may vary somewhat from the indicated norm), are presently preferred for this purpose. The picks 2 likewise may be in the form of either single continuous filaments or strands of plural continuous filaments of such synthetic textile fibers, for example, as nylon, polyester and polypropylene (400 denier nylon or polyester monofilament, 500 denier polypropylene monofilament and 840 denier nylon multifilament yarn have been used and found satisfactory). The filaments preferably are coated or otherwise treated with a resorcinol formaldehyde latex or the like to enhance their adhesion to rubber, and the filaments may be drawn or undrawn, subject to the requirement that their tensile strengths be such as to enable them to break or at least stretch sufficiently during the shaping and curing of a tire so as not to interfere with that operation. Optimally, the picks 2 are about one-half inch apart, although their spacing may vary somewhat from this mean value, down to as little as about one-eighth inch and up to about 1 inch.

The method and apparatus according to the present invention used for the manufacture of the woven wire tire cord fabric F will now be described with reference to FIG. 1. The individual wire tire cords 4 are initially wound on respective spools or rolls 5 mounted in a creel 6 in conventional manner. From the creel, the cords pass through any suitable guide means such as an eye board 7 and thence selectively around suitable guide bars 8 to transform the entire set of cords into a planar array of cords all parallel to one another. In that condition, the cords pass through a reed-like guide structure 9 of any suitable construction to a loom generally designated L, where the picks are inserted in the usual manner. For the purposes of the present invention, the loom L is a conventional textile loom and thus is illustrated only diagrammatically by the schematic representation of the shed, the lay and reed 10, and the guide roll 11 at the fabric let-off end of the loom. The woven fabric 12 then passes to a take-up location where it is wound onto a suitable beam or take-up roll 14.

As previously indicated, for the purposes of the present invention the loom requires certain auxiliary equipment in order to ensure the maintenance of a controlled tension on the tire cords 4 continuously from the time they enter the loom until they have left the same as warps of the woven fabric being wound up on the roll or beam 14. Accordingly, there are provided in front of the loom (as viewed in the direction of movement of the cords), i.e., intermediate the reed 9 and the cord intake end of the loom, a series of feed rolls 15, 16, etc., (only two are shown) which are geared to or synchronized with each other and around which the cords pass as they move toward the loom L, while behind the loom (as viewed in the direction of movement of the woven fabric from the loom), i.e., intermediate the fabric let-off end of the loom and the take-up station, there are provided a series of draw rolls 17 to 20 (these are actually mounted in a single framework and constitute a pull stand) which are geared to or synchronized with each other and around which the fabric passes as it moves toward the take-up roll or beam 14. Both the last in the series of feed rolls and the last in the series of draw rolls are positively driven, the former by a variable speed motor 21 and the latter by a variable torque motor 22, and all the feed and draw rolls are provided with high friction surfaces, such as coatings of a suitable polyurethane composition, to minimize the possibility of slippage between the tire cords and the rolls. Concomitantly, there are closely juxtaposed to the first of the series of feed rolls and the last of the series of draw rolls, respective weighted or otherwise biased pressure rolls 23 and 24, the pressure roll 23 defining in conjunction with the feed roll 15 a nip for passage of the tire cords 4 being fed to the loom, and the pressure roll 24 defining in conjunction with the draw roll 20 a nip for passage of the woven fabric being fed to the take-up roll 14. The core of the latter during the winding operation is axially mounted on a rotatable spindle or like supporting means 25 which is positively driven by a variable torque motor 26.

The entire system is normally so operated in accordance with the principles of the present invention, that in a fabric-producing operation the required substantially constant and uniform tension is maintained on each tire cord from the time it is engaged by the feed rolls until it is wound onto the take-up roll. In particular, it is preferred to maintain the tension between about 0.9 and about 1.7 lb./end, for which purpose the pressure roll 23 is biased to exert a pressure between about 0.13 and about 0.51 lb./end, the pressure roll 24 is biased to exert a pressure between about 0.22 and about 0.33 lb./end, and the motors 22 and 26 are set to deliver about 1,900 and about 3,980 inch-pounds of torque, respectively. It is to be noted, in this connection, that the take-up roll 14 is centerdriven and that its drive motor 26 is set for a torque output of approximately twice that of the pull stand drive motor 22, so as to ensure that the fabric is wound onto the take-up roll with optimum tightness in its various turns and with the possibility of telescoping or lateral displacement of adjacent turns relative to each other effectively minimized. The motors 22 and 26 will, of course, compensate automatically for any changes in cord tension that may arise during the weaving and take-up operations.

As will be clear to those skilled in the art, of course, the apparatus will also include certain other adjuncts normally associated with looms, such as stop motions 27, 28 and 29, added guide bars or rolls such as 30 and 31 wherever necessary, a temple (not shown), and so forth. The stop motion 29 in particular is designed to enable the loom to be stopped if for some reason a pick has been omitted from the weave. The fabric can then be fed backwards relative to the loom for the required distance to permit the missing pick to be inserted by hand. To ensure that the slack in the cords 4 occurring during such reverse feed is taken up, the apparatus further includes an accumulator 32, which in essence is simply a pair of spaced stationary rolls below the array of cords and a weighted vertically movable roll above and riding on the array of cords, the latter roll being juxtaposed to and adapted to pass through the space between the stationary rolls. The apparatus will also have associated therewith means (not shown) for cutting the fabric 12 when the beam 14 is full. Such cutting means may, for example, be arranged to sever the wound-up portion of the fabric from the following portion along a line between the pressure roll 24 and the guide roll 30. It is seen, therefore, that the pressure roll 24 also serves the function of ensuring that even after the cut, the required tension will be maintained in the tire cords extending back to the loom until the severed leading edge of the woven fabric is secured to the next empty beam and the winding operation is resumed.

It will be understood that the foregoing description of preferred aspects of the present invention is for purposes of illustration only, and that the herein disclosed structural and operational features and relationships, as well as the natures of the component materials utilized, are susceptible to a number of modifications and changes none of which entails any departure from the spirit and scope of the present invention as defined in the hereto appended claims.

Having thus described the invention, what is claimed and desired to be secured by Letters Patent is:

1. In the method of making a woven wire tire cord fabric composed of metal wire tire cords extending in the warp direction and continuous filament picks; the improvement comprising the steps of:
    A. advancing said wire tire cords into a loom through the nip between a high friction surfaced driven first feed roll and a first pressure roll biased thereagainst;
    B. interweaving said picks with said wire tire cords in said loom at relatively wide spacings of about one-eighth to about 1 inch between adjacent picks;
    C. advancing the resultant woven wire tire cord fabric from said loom to a take-up station through the nip between a high friction surfaced driven second feed roll and a second pressure roll biased thereagainst;
    D. winding said woven wire tire cord fabric onto a center-driven take-up roll at said take-up station; and
    E. maintaining said wire tire cords, during the advance thereof from their entry into said loom to their arrival as warps of said woven wire tire cord fabric at said take-up station, under a substantially constant, uniform tension of between about 0.9 and 1.7 lbs./end.

2. The method of claim 1, wherein the driving torque applied to said take-up roll is approximately twice as high as the driving torque applied to said second feed roll.

3. The method of claim 1, wherein said picks are spaced about ½ inch apart.

4. The method of claim 3, wherein said picks are mono-filamentary in nature.

5. The method of claim 3, wherein said picks are multi-filamentary in nature.

6. The method of claim 3, wherein said picks are made of a synthetic textile fiber material.

7. In an apparatus for making a woven wire tire cord fabric and including a loom for interweaving a plurality of metal wire tire cords extending in the warp direction with continuous filament picks; the improvement comprising:
    A. first driven roll means positioned in front of said loom for feeding said wire tire cords to said loom, said first roll means including a series of first rolls each having a high friction surface to minimize slippage between said wire tire cords and said first rolls;
    B. a first pressure roll juxtaposed to and biased against the first in said series of said first rolls to define a nip for passage of said wire tire cords therethrough;
    C. fabric take-up means positioned behind said loom and including driven rotatable means for axially supporting the core of a take-up roll for said woven wire tire cord fabric;
    D. second driven roll means positioned intermediate the fabric let-off end of said loom and said take-up means for feeding said woven wire tire cord fabric to said take-up means, said second roll means including a series of second rolls each having a high friction surface to minimize slippage between said wire tire cords and said second rolls; and
    E. a second pressure roll juxtaposed to and biased against the last in said series of said second rolls to define a nip for passage of said woven wire tire cord fabric therethrough;
    F. the respective drives of said first and second roll means and said take-up means being constructed and arranged to ensure maintenance of a substantially constant, uniform tension of between about 0.9 and about 1.7 lbs./end on said wire tire cords from their entry into said loom to their arrival as the warps of said woven wire tire cord fabric at said take-up means.

8. An apparatus according to claim 7, wherein said respective drives comprise a variable speed motor for driving said first roll means, a first variable torque motor for driving said second roll means, and a second variable torque motor for driving said rotatable means of said take-up means.

9. An apparatus according to claim 8, wherein said second variable torque motor provides a torque output approximately twice as high as that provided by said first variable torque motor.

10. An apparatus according to claim 9, wherein said variable speed motor is connected to the last in the series of said first rolls, and said first variable torque motor is connected to the last in the series of said second rolls.

11. An apparatus according to claim 7, wherein said first pressure roll is biased to exert a force between about 0.13 and about 0.51 lb./end, and said second pressure roll is biased to exert a force between about 0.22 and about 0.33 lb./end.

* * * * *